(12) United States Patent
Chalupsky et al.

(10) Patent No.: US 7,325,358 B1
(45) Date of Patent: Feb. 5, 2008

(54) WEATHER PROTECTED DEER AND ANIMAL REPELLENT CONTAINER

(75) Inventors: Clayton Wayne Chalupsky, Cedar Rapids, IA (US); Curtis Nelson, Cedar Rapids, IA (US); Roger C. Klouda, Iowa City, IA (US)

(73) Assignee: RepelIt LLC, Cedar Rapids, IA (US)

( * ) Notice: Subject to any disclaimer, the term of this patent is extended or adjusted under 35 U.S.C. 154(b) by 0 days.

(21) Appl. No.: 11/307,332

(22) Filed: Feb. 1, 2006

Related U.S. Application Data

(63) Continuation-in-part of application No. 10/906,874, filed on Mar. 10, 2005.

(51) Int. Cl.
*A01M 13/00* (2006.01)

(52) U.S. Cl. .............. 43/124; 43/129; 43/131; 239/34; 239/55; 239/57

(58) Field of Classification Search ........... 43/124, 43/131, 132.1, 125, 129; 239/34, 36, 53, 239/55–59, 289
See application file for complete search history.

(56) References Cited

U.S. PATENT DOCUMENTS

| | | | | |
|---|---|---|---|---|
| 187,016 A * | 2/1877 | Johnston | ...... | 43/125 |
| 478,691 A * | 7/1892 | De Shon | ...... | 43/131 |
| 495,091 A * | 4/1893 | Jenisch | ...... | 43/131 |
| 877,309 A * | 1/1908 | Emerson | ...... | 239/55 |
| 1,013,514 A * | 1/1912 | Rand | ...... | 43/131 |
| 1,056,535 A * | 3/1913 | Grimes et al. | ...... | 43/131 |
| 1,477,273 A * | 12/1923 | Liss | ...... | 43/131 |
| 1,631,121 A * | 6/1927 | Eckl | ...... | 43/131 |
| 1,729,389 A * | 9/1929 | Hughett | ...... | 43/131 |
| 1,732,028 A * | 10/1929 | Reiner | ...... | 239/36 |
| 1,748,449 A * | 2/1930 | Hughett | ...... | 43/131 |
| 1,769,409 A * | 7/1930 | Armstrong | ...... | 239/56 |
| 1,780,407 A * | 11/1930 | Smith | ...... | 43/131 |
| 1,780,408 A * | 11/1930 | Smith | ...... | 43/131 |
| 1,815,595 A * | 7/1931 | Simpson | ...... | 43/131 |
| 1,818,684 A * | 8/1931 | Blechman | ...... | 239/57 |
| 1,902,723 A * | 3/1933 | Roberts | ...... | 43/131 |
| 1,916,982 A * | 7/1933 | Jones | ...... | 43/131 |
| 1,921,821 A * | 8/1933 | Higgins | ...... | 239/57 |
| 1,971,390 A * | 8/1934 | Van Yahres | ...... | 43/129 |
| 1,980,754 A * | 11/1934 | Henning et al. | ...... | 43/132.1 |
| 2,004,121 A * | 6/1935 | Loibl, Jr. | ...... | 43/131 |
| 2,086,046 A * | 7/1937 | Preston | ...... | 43/124 |
| 2,243,752 A * | 5/1941 | Dunaway | ...... | 239/36 |
| 2,383,960 A * | 9/1945 | Dupuy | ...... | 239/59 |
| 2,412,326 A * | 12/1946 | Dupuy | ...... | 239/59 |
| 2,418,878 A * | 4/1947 | Harkins | ...... | 43/131 |

(Continued)

FOREIGN PATENT DOCUMENTS

CA 2227015 A1 * 9/1999

(Continued)

*Primary Examiner*—Darren W. Ark
(74) *Attorney, Agent, or Firm*—Ryan N. Carter

(57) ABSTRACT

A device for displaying an odorous animal repellent. The device comprises a housing having a chamber adapted for receiving the animal repellent. The device further comprises a retainer on the underside of the housing which allows permeation of the scent of the animal repellent from the chamber into the air surrounding the chamber, but does not allow the animal repellent to sift through the retainer.

13 Claims, 6 Drawing Sheets

U.S. PATENT DOCUMENTS

| | | | | |
|---|---|---|---|---|
| 2,510,126 A * | 6/1950 | Melcher et al. | | 43/129 |
| 2,606,065 A * | 8/1952 | Logan et al. | | 43/131 |
| 2,629,628 A * | 2/1953 | Vaillancourt | | 43/131 |
| 2,674,018 A * | 4/1954 | Crippen | | 43/129 |
| 2,690,030 A * | 9/1954 | Thompson | | 239/57 |
| 2,734,769 A * | 2/1956 | Holz | | 239/57 |
| 2,766,066 A * | 10/1956 | Hopson et al. | | 239/34 |
| 2,825,996 A * | 3/1958 | Grant | | 43/131 |
| 2,837,861 A * | 6/1958 | Graham, Sr. | | 43/131 |
| 2,893,160 A * | 7/1959 | Grant | | 43/131 |
| 2,959,354 A * | 11/1960 | Beck | | 239/36 |
| 3,046,192 A * | 7/1962 | Bilyen | | 43/124 |
| 3,134,544 A * | 5/1964 | Copley | | 239/55 |
| 3,576,088 A * | 4/1971 | Arca | | 239/57 |
| 3,702,677 A * | 11/1972 | Heffington | | 239/55 |
| 3,790,081 A * | 2/1974 | Thornton et al. | | 239/55 |
| 3,799,118 A * | 3/1974 | Sandefur | | 239/36 |
| 3,826,036 A * | 7/1974 | Neugebauer | | 43/131 |
| 3,837,574 A * | 9/1974 | Curran | | 239/57 |
| 3,848,803 A * | 11/1974 | Levey | | 239/59 |
| 3,896,995 A * | 7/1975 | Lelicoff | | 43/132.1 |
| 4,037,353 A * | 7/1977 | Hennart et al. | | 43/129 |
| 4,065,872 A * | 1/1978 | Patton et al. | | 43/131 |
| 4,126,958 A * | 11/1978 | Yokoyama | | 43/127 |
| 4,154,398 A * | 5/1979 | Gualandi | | 239/59 |
| 4,194,690 A * | 3/1980 | Stever et al. | | 43/131 |
| 4,214,146 A * | 7/1980 | Schimanski | | 43/129 |
| 4,277,024 A * | 7/1981 | Spector | | 239/36 |
| 4,361,279 A * | 11/1982 | Beacham | | 239/56 |
| 4,374,571 A * | 2/1983 | Hirvela | | 239/36 |
| 4,441,272 A * | 4/1984 | Bartz | | 43/131 |
| 4,451,460 A * | 5/1984 | Hansen et al. | | 514/170 |
| 4,523,717 A * | 6/1985 | Schwab | | 43/131 |
| 4,534,976 A * | 8/1985 | Hansen et al. | | 514/169 |
| 4,549,693 A * | 10/1985 | Barlics | | 239/58 |
| 4,552,307 A * | 11/1985 | Stedham | | 43/131 |
| 4,657,759 A * | 4/1987 | Hansen et al. | | 514/169 |
| 4,662,103 A * | 5/1987 | Cheng | | 43/131 |
| 4,802,626 A * | 2/1989 | Forbes et al. | | 239/36 |
| 4,804,142 A * | 2/1989 | Riley | | 43/131 |
| 4,878,615 A * | 11/1989 | Losi | | 239/57 |
| 4,908,977 A * | 3/1990 | Foster | | 43/131 |
| 4,917,301 A * | 4/1990 | Munteanu | | 239/57 |
| 4,969,599 A * | 11/1990 | Campbell | | 239/57 |
| 4,995,555 A * | 2/1991 | Woodruff | | 239/55 |
| 4,995,556 A * | 2/1991 | Arnold, III | | 239/57 |
| 5,072,849 A * | 12/1991 | Blau | | 239/59 |
| 5,083,708 A * | 1/1992 | Walters | | 239/55 |
| 5,150,541 A * | 9/1992 | Foster et al. | | 43/131 |
| 5,307,584 A * | 5/1994 | Jarvis | | 239/57 |
| 5,356,881 A * | 10/1994 | Verbiscar | | 514/26 |
| 5,379,545 A * | 1/1995 | Gall et al. | | 43/131 |
| D370,247 S * | 5/1996 | Shammas | | D22/120 |
| 5,544,812 A * | 8/1996 | Torres | | 239/55 |
| 5,575,992 A * | 11/1996 | Kunze | | 239/34 |
| 5,738,851 A * | 4/1998 | Colavito | | 424/753 |
| 5,746,021 A * | 5/1998 | Green | | 43/131 |
| 5,873,193 A * | 2/1999 | Jensen | | 43/131 |
| 5,943,815 A * | 8/1999 | Paganessi et al. | | 43/132.1 |
| 5,943,816 A * | 8/1999 | Hyatt et al. | | 43/131 |
| 5,970,643 A * | 10/1999 | Gawel, Jr. | | 43/1 |
| 6,061,950 A * | 5/2000 | Carey et al. | | 43/125 |
| 6,109,539 A * | 8/2000 | Joshi et al. | | 239/57 |
| 6,192,621 B1 * | 2/2001 | Fain | | 43/131 |
| 6,241,161 B1 * | 6/2001 | Corbett | | 239/58 |
| 6,244,518 B1 * | 6/2001 | Pogue | | 239/36 |
| 6,272,790 B1 * | 8/2001 | Paganessi et al. | | 43/132.1 |
| 6,460,487 B1 * | 10/2002 | Betzen | | 119/712 |
| 6,475,504 B1 * | 11/2002 | Stewart | | 424/406 |
| 6,648,239 B1 * | 11/2003 | Myny et al. | | 239/57 |
| 7,048,203 B2 * | 5/2006 | Harada et al. | | 239/36 |
| 7,051,681 B2 * | 5/2006 | Pope | | 119/712 |
| 7,147,171 B2 * | 12/2006 | Harada et al. | | 239/36 |
| 2003/0037476 A1* | 2/2003 | Peavy | | 43/1 |
| 2003/0170180 A1* | 9/2003 | Bahary | | 424/10.4 |
| 2004/0003530 A1* | 1/2004 | Younker | | 43/1 |
| 2004/0124254 A1* | 7/2004 | Harada et al. | | 239/36 |
| 2004/0228896 A1* | 11/2004 | Harada et al. | | 43/124 |
| 2005/0005504 A1* | 1/2005 | Munagavalasa et al. | | 43/129 |
| 2005/0089543 A1* | 4/2005 | Weiser | | 424/410 |
| 2006/0064925 A1* | 3/2006 | Morgan | | 43/125 |
| 2006/0130391 A1* | 6/2006 | Livingston | | 43/124 |
| 2006/0137241 A1* | 6/2006 | Yamasaki et al. | | 43/125 |
| 2006/0201054 A1* | 9/2006 | Katsuura et al. | | 43/129 |
| 2006/0207163 A1* | 9/2006 | Frokopy | | 43/131 |
| 2006/0260183 A1* | 11/2006 | Hockaday | | 43/129 |

FOREIGN PATENT DOCUMENTS

| | | | |
|---|---|---|---|
| CH | 603037 A5 * | 8/1978 | |
| DE | 2264312 A * | 7/1974 | |
| DE | 3939451 A1 * | 7/1990 | |
| EP | 100730 A1 * | 2/1984 | |
| EP | 294175 A1 * | 12/1988 | |
| EP | 1270021 A1 * | 1/2003 | |
| FR | 2738717 A1 * | 3/1997 | |
| FR | 2823071 A1 * | 4/2001 | |
| WO | WO-95/19305 A1 * | 7/1995 | |

* cited by examiner

WEATHER PROTECTED DEER AND ANIMAL REPELLENT CONTAINER

RELATED APPLICATIONS

The present patent application is a Continuation-in-Part of U.S. patent application Ser. No. 10/906,874 filed on Mar. 10, 2005 which claims the benefit of U.S. Provisional Patent Application No. 60/552,394 filed on Mar. 12, 2004. These patent applications are hereby incorporated by reference.

BACKGROUND OF THE INVENTION

The present invention relates to a container for protectively displaying an odorous animal repellent.

Animal repellents are typically powders or liquids which contain ingredients that are offensive to animals such as deer, dogs, cats, wolves, gophers, mice, raccoons, squirrels, and rabbits. These repellents are used to prevent damage caused by animals which browse and eat vegetation such as trees, flowers, shrubs, gardens, vines, and lawns. One prior art method of utilizing the volatile repellents is to directly apply the repellent to the vegetation. One problem with this method is that most repellents are toxic and can damage vegetation and may not be used on fruits or other plants intended for human consumption. Another problem with this method is that the effectiveness of such repellents diminishes rapidly in outdoor conditions, particularly when rain dilutes and washes such repellents off of the applied areas. Therefore, it is often necessary to reapply the repellent multiple times during a single season to achieve effective results when using the direct application method.

One device which has attempted to overcome the shortfalls of the above direct application method is described in U.S. Pat. No. 5,379,545 (Gall). The device disclosed in the Gall patent is a container having a ground engaging pin which supports a covered chamber. The chamber is adapted to receive animal repellent and the cover portion of the chamber is adapted to protect the repellent from rain. One problem with this device is that the user must remove the cover and physically insert the repellent into the chamber. The handling of animal repellents such as dried blood can be undesirable for users who find such products to be unpleasant. Further, direct handling of the animal repellent is not desirable for any user if the animal repellent is hazardous to human health.

Another problem with the Gall device is that the animal repellent housed in the chamber is accessible by insects through openings which allow the odor of the repellent to diffuse from the chamber into the outside air. Insects which may be attracted to the repellent may eat or carry away the repellent thereby requiring it to be replaced at an unacceptably fast rate. Insects which are attracted to the repellent may even build a nest inside the chamber thereby inhibiting the odor of the repellent from exiting the chamber. The invasion of insects can be an unclean and unwelcome nuisance for the user of the device who may be using the device near their house.

It is therefore an object of the invention to provide a means for displaying an odorous repellent to deer and other animals in a manner where the repellent is not susceptible to rain, winds, insects, or small animals.

It is further an object of the invention to provide a waterproof animal repellent container, complete with repellent, to the consumer in a ready to use condition so that there is no need for the user to handle the repellent.

Yet another object of the present invention is to provide a device which will substantially increase the time that a repellent is effective.

Yet another object of this invention is to protect against toxicity to animals and plants.

Other objects and advantages will be apparent from the disclosure and claims which follow taken together with the appended drawings.

SUMMARY OF THE INVENTION

The present invention is a device adapted to hold a solid and/or granular odorous animal repellent. In use, the device is placed near flowers, shrubs, trees, or like vegetation so as to repel animals, such as deer, which may eat the plants or may otherwise pose a nuisance. Generally, the device comprises a chamber which is adapted to receive the repellent. The chamber is covered by a waterproof housing at its upper end which keeps the chamber dry during precipitation. The housing also covers the sides of the chamber, but does not completely enclose the lower portion of the chamber. The lower portion of the chamber is sealed by a retainer which is adapted to allow the permeation of the odorous animal repellent from the chamber into the surrounding air. In one embodiment the retainer is comprised of a fibrous material that allows the permeation of the odor of the animal repellent, yet does not allow the sifting of the animal repellent through the fibrous material. Nor does this embodiment allow the invasion of insects through the fibrous material into the chamber. In another embodiment, the retainer comprises a plurality of pores that may allow the invasion of insects into the chamber, but in this embodiment, the animal repellent is enclosed in a fibrous pouch that does not allow the invasion of insects into the pouch.

In some embodiments, the device comprises a guard or shield member that extends below the housing. The shield serves to keep animals such as raccoons from being able to pierce the retainer with their claws and gain access to the animal repellent inside the chamber. The shield also allows the device to be free standing while still allowing the odorous animal repellent to permeate from the lower portion of the chamber.

DESCRIPTION OF THE PREFERRED EMBODIMENT OF THE INVENTION

Figure 1:
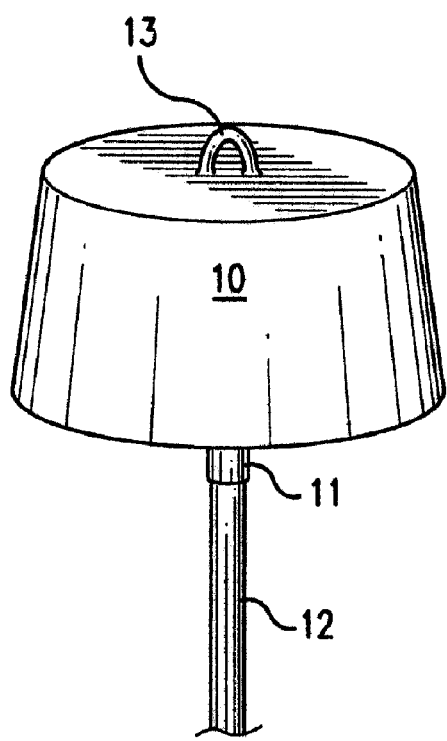
FIG. 1 is a perspective view showing the device mounted onto a rod.

The present invention is a device adapted to hold a solid and/or granular odorous animal repellent 20. It should be noted that all words used in this specification such as upper, lower, top, and bottom, are relative to the device as it is mounted on a rod 12 with the connector 11 facing toward the ground, as shown in FIG. 1.

As seen in FIGS. 1, 3, 5, and 8 the device comprises a cup-like water proof housing 10 having a chamber 15 which is adapted to receive the animal repellent 20. The top and sides of the chamber 15 are enclosed by the housing 10 so as to reduce the likelihood of precipitation entering the chamber 15 where it may contact and adversely impact the effectiveness of the animal repellent 20. As seen best in FIGS. 2-5, the housing 10 does not completely enclose the lower portion of the chamber 15. Rather, a retainer plate 14, 16 is combined with the lower portion of the chamber 15. The retainer plate 14, 16 allows the odorous animal repellent 20 housed in the chamber 15 to permeate into the air surrounding the device, yet the retainer 14, 16 keeps the repellent 20 inside the chamber 15.

As shown in FIGS. 1-5, and 8 the device further comprises a connector 11 which is combined with the upper portion of the chamber 15 by any suitable means. In one embodiment, the connector 11 is a tube which projects from the chamber 15 as shown in FIGS. 1-5. In the embodiment shown in FIG. 8, the connector 11 is a tube that does not project from the chamber 15. In some embodiments, the connector 11 tube has an opening adapted to accept a rod 12 or stake placed in the ground so as to display the device, with repellent 20, to the animals at a predetermined distance above the ground. Any suitable rod 12 member can be used for this purpose. In the preferred embodiment, the rod 12 is a single member that is bendable so that it can be bent to fit inside the device's packaging container, yet can be straightened by the end user to display the device at some predetermined distance above the ground. In another embodiment, the rod 12 is comprised of several interlocking sections adapted to fit inside the device's packaging container. In this embodiment, the user can adjust the height of the device by adding or removing sections of rod 12. As seen in FIG. 1, the device may also comprise an opening 13 near the top outside portion of the housing 10. This opening 13 is adapted to receive a wire or string to allow a user to hang the device from a branch or fence.

As discussed above, one purpose of the connector 11 is to combine with a rod 12 for mounting the device in the user's yard, however, the connector 11 also serves to help combine and support the elements of the device. In the one embodiment, the connector is tapered (not shown) so that it becomes narrower toward its bottom end. The taper helps to secure the retainer 14, 16 and ring 18 to the connector 11 as they are combined with connector 11 because the openings in the retainer 14, 16 and ring 18 are of a fixed diameter. It should be noted that the ring 18 can be any shape suitable to combine with the lower portion of the chamber 15.

Figure 2:
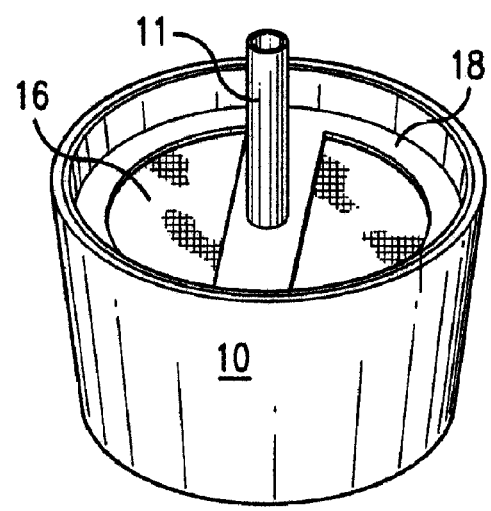
FIG. 2 is a perspective view of the first embodiment of the device showing the fibrous retainer plate combined with the housing.
Figure 3:
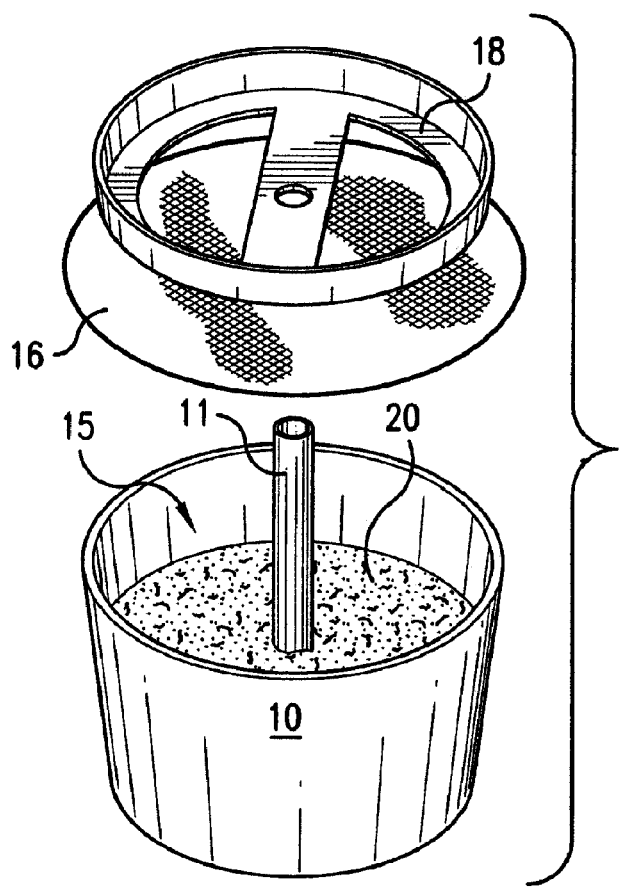
FIG. 3 is a perspective view of the first embodiment of the device showing the fibrous retainer plate removed from the housing.

FIGS. 2 and 3 show the first preferred embodiment wherein the retainer plate 16 is made of a fibrous material. The fibrous material allows the permeation of the odorous repellent housed in the chamber 15, but the weave on the fiber is tight enough to prevent the majority of the particles of the animal repellent 20 from sifting through. The weave is also tight enough to prevent insects from penetrating it and entering the chamber 15.

Figure 6:
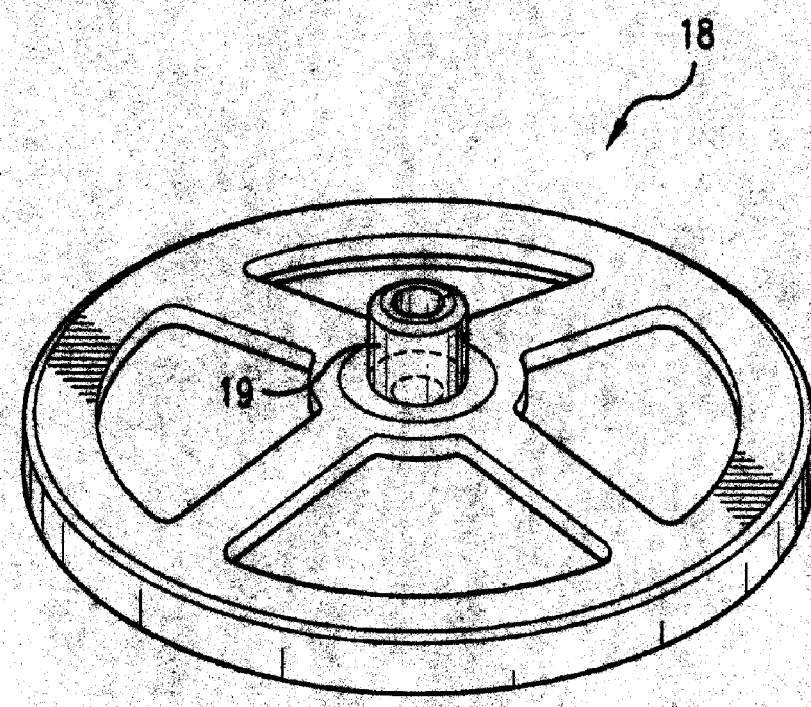
FIG. 6 is a perspective view of an alternate embodiment of the device showing the retainer plate having a collar.
Figure 7:
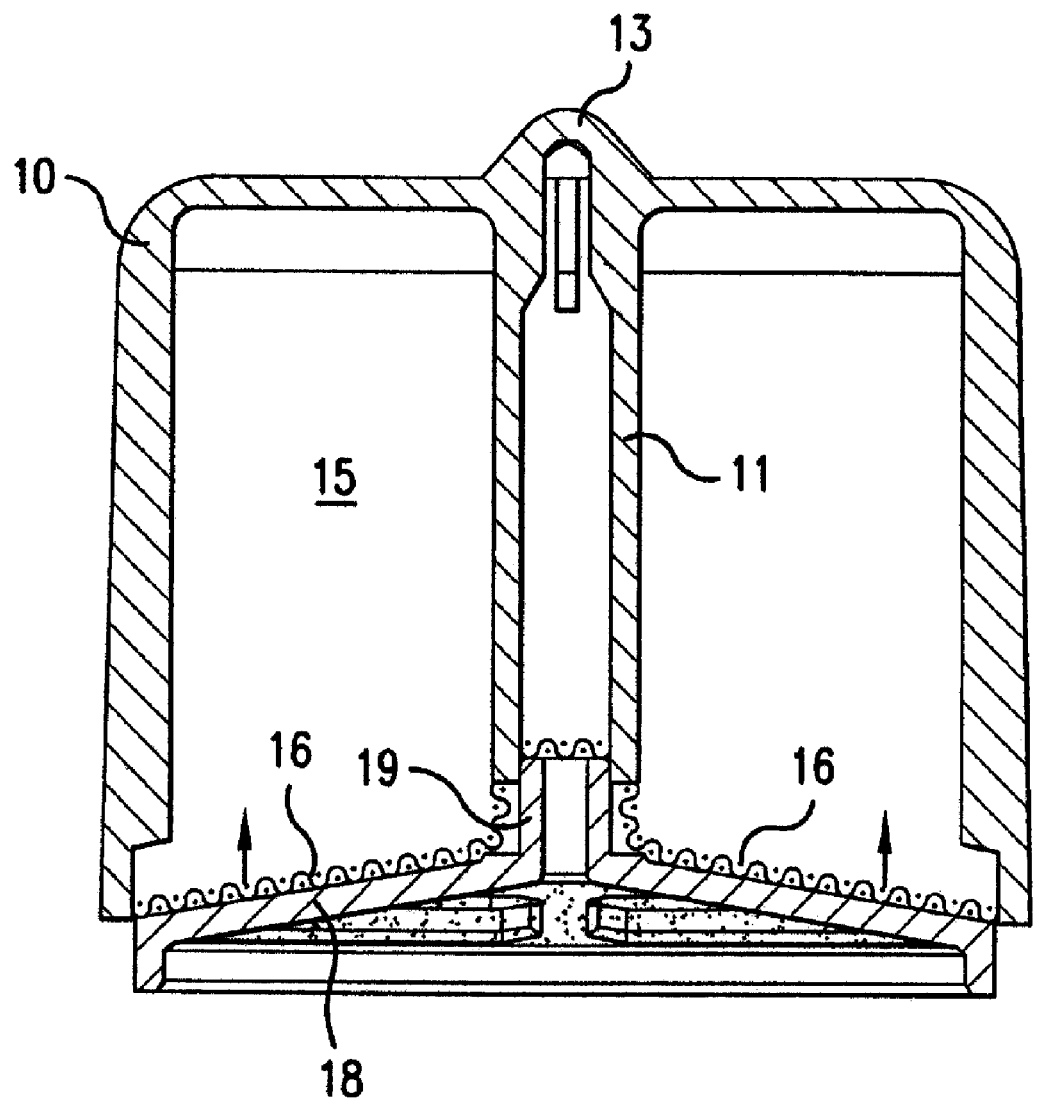
FIG. 7 is a side elevational view showing the collar of the retainer plate of FIG. 6 being combined with the opening in the connector.

As shown in FIG. 3, the fibrous retainer plate 16, ring 18, and housing 10 are separate pieces. In order to seal the chamber 15 to prevent the invasion of insects, the pieces must fit tightly together. One means for combining the pieces is to secure ring 18 to the housing 10 by an interference fit between the ring 18 and the chamber 15 walls. The diameter of the fibrous retainer plate 16 is larger than that of the housing 10 so that a portion of the fibrous retainer plate 16 is captured between the outer rim of the ring 18 and the wall of the chamber 15. A similar interference fit means for combining the elements of the device is shown in FIGS. 6 and 7 wherein ring 18 further comprises a collar 19. FIG. 7 shows how collar 19 fits into the opening in connector 11 inside the chamber 15. (In this variation, connector 11 does not extend outside of the chamber 15.) In addition to being captured between the outer rim of the ring 18 and the wall of the chamber 15, a portion of the fibrous retainer plate 16 is captured between the collar 19 and the connector 11. This helps prevent animal repellent 20 from leaking out around the connector 11. The collar 19 and connector 11 may receive a rod 12 to display the device at some predetermined distance above the ground as described above.

It should be noted that the plastic ring 18 of retainer 16 may be held in place by means other than or in addition to an interference fit. For example, ring 18 may be adhesively combined with housing 10 by adhesively combining the ring 18 to the walls of the chamber 15, or, adhesively combining the connector 11 to the top portion of the chamber 15 and then adhesively combining the connector 11 with the ring 18.

Figure 4:
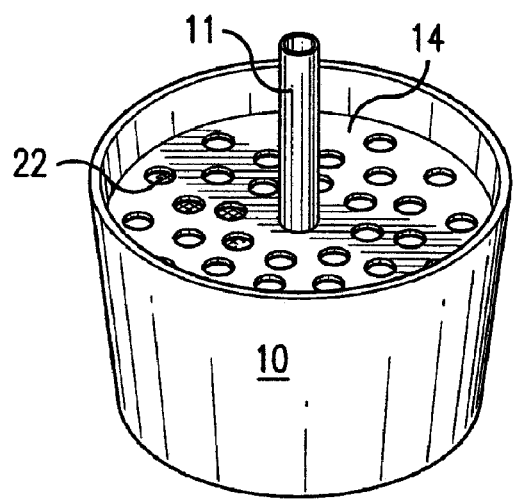
FIG. 4 is a perspective view of the second embodiment of the device showing the porous retainer plate combined with the housing.
Figure 5:
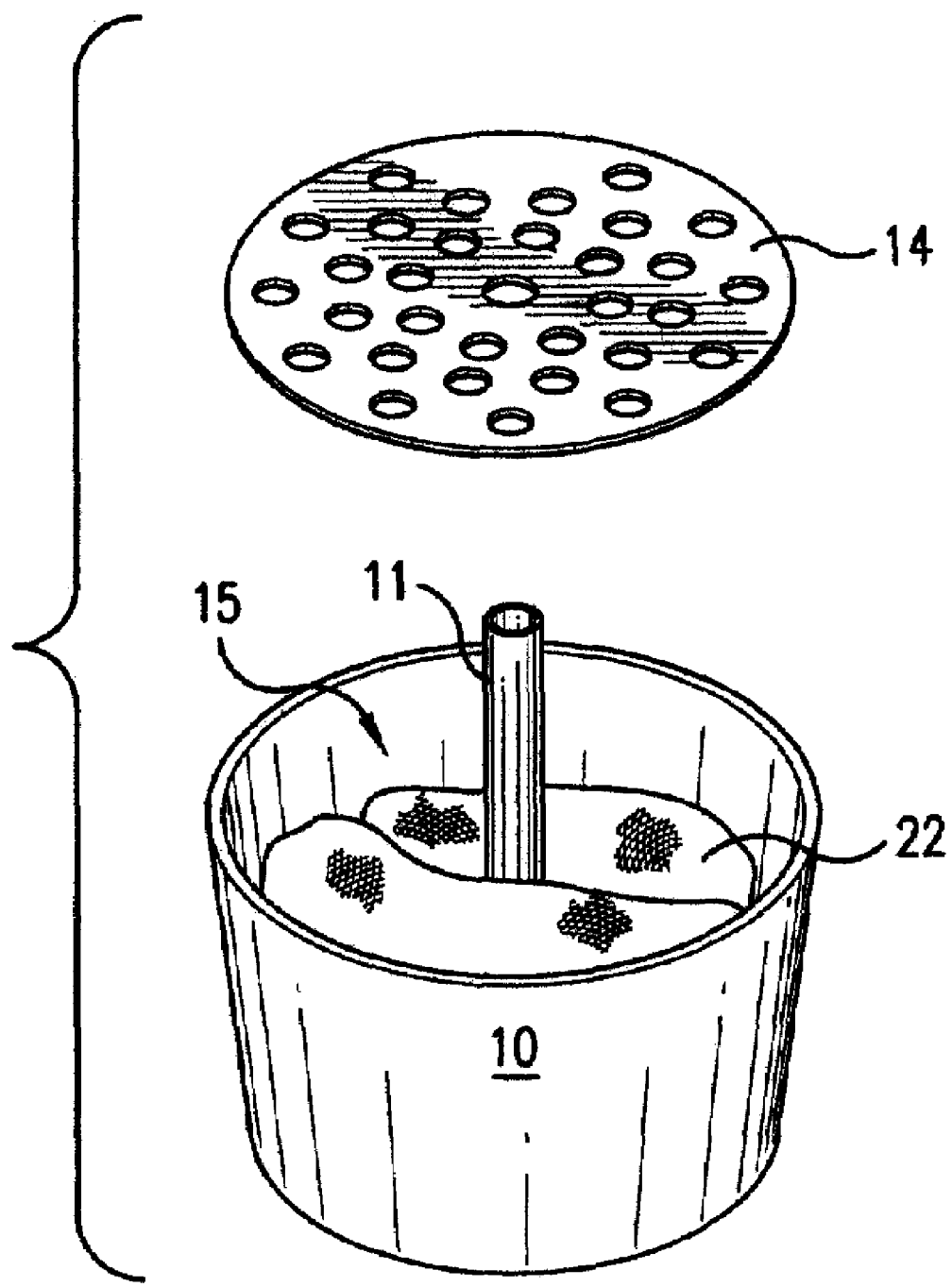
FIG. 5 is a perspective view of the second embodiment of the device showing the porous retainer plate removed from the housing.

The second embodiment is shown in FIGS. 4 and 5 wherein the retainer plate 14 comprises a plurality of pores. In this embodiment, the retainer plate 14 is preferably comprised of a molded plastic material so that it is rigid and durable. The rigidity and durability of this molded plastic retainer plate 14 help to prevent raccoons and other animals from gaining access to the animal repellant product in the chamber 15. In this embodiment, the animal repellent 20 is enclosed in one or more bags or pouches 22. The pouches 22 are made of a material similar to the above described fibrous material in that the pouch 22 allows the permeation of the odorous repellent, but the weave on pouch 22 is tight enough to prevent the particles of the animal repellent from sifting through the pouch 22. The weave of the pouch 22 material is also tight enough to prevent insects from penetrating it. The retainer plate 14 of this second embodiment can be combined with the lower portion of the chamber 15 by any suitable means, including those described above.

Although any suitable animal repellent product may be used with the present invention, in the preferred embodiment, the animal repellent is a dried blood product in granular form. Dried blood products are particularly suited for repelling deer because, although it is odorless to humans, it has strong odor of danger to deer. Numerous other animal repellent products such as moth bolls can be used with the present invention to repel a number of different species of animals.

Figure 8:
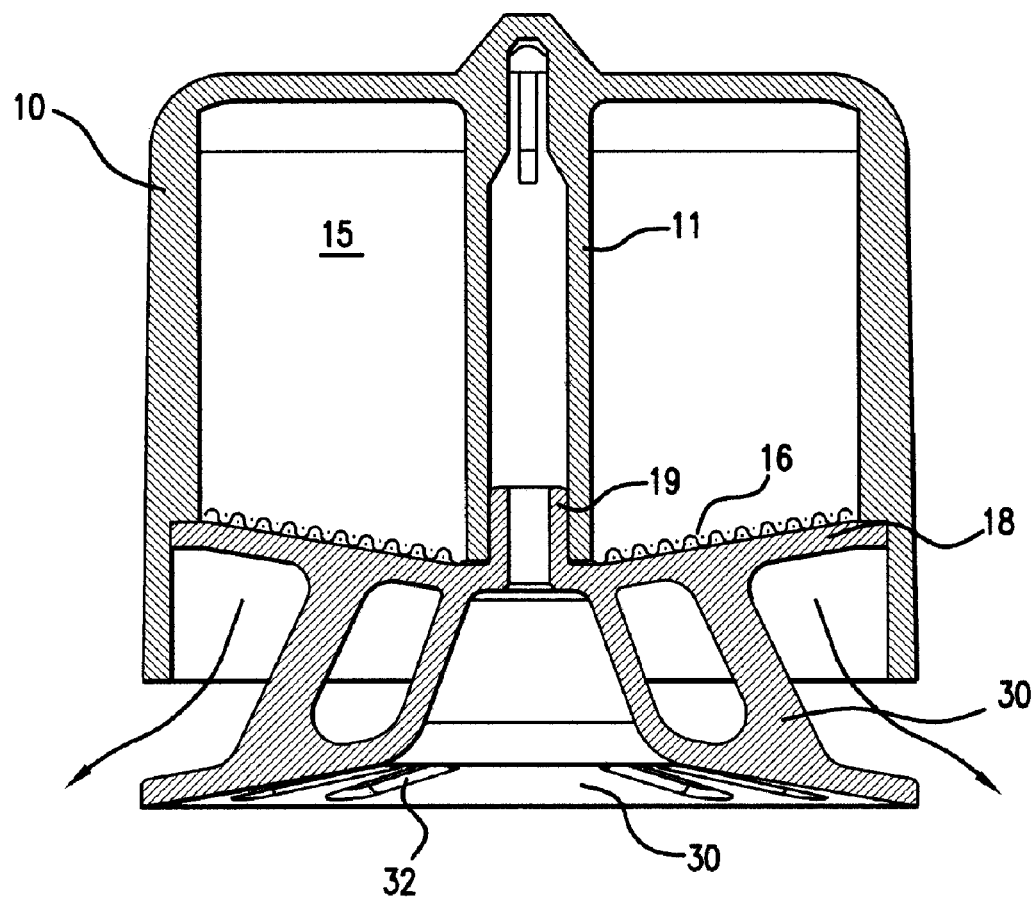
FIG. 8 is a side elevations view showing the shield extending below the housing.
Figure 9:
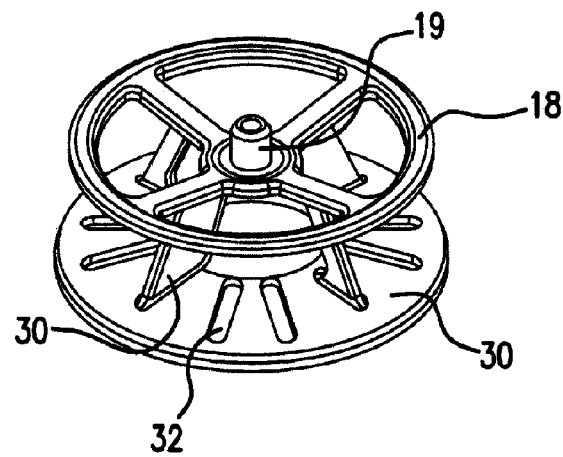
FIG. 9 is a perspective view of the guard combined with the ring.

FIGS. 8 and 9 show a guard or shield member 30 that may be used with the present invention. The shield 30 may be used with any embodiment; however, it is preferably used with the embodiment having the fibrous retainer plate 16. The shield 30 is preferably made of a rigid material such as a molded plastic so that it is not easily bent or broken by small animals such as raccoons. The shield 30 is preferably combined with ring 18 (shown alone in FIG. 6) so that the shield 30 and ring 18 are one piece as shown in FIGS. 8 and 9. In that regard, the ring 18/shield 30 and retainer plate 16 are combined with the device as discussed above with reference to FIGS. 6 and 7. The shield 30 extends below ring 18 so that in use there is some distance between the fibrous retainer plate 16 and the lower portion of the shield 30. The shield 30 comprises narrow openings 32 so that the animal repellent 20 scent can adequately permeate into the air surrounding the device as shown by the arrows in FIG. 8.

The shield 30 serves to keep raccoons and other small animals that may be attracted to the animal repellent 20 from being able to pierce the fibrous retainer plate 16 with their claws and gain access to the animal repellent 20. The shield 30 also allows the entire animal repellent device to be free standing. For example, if the device is being used to repel mice, the device can be placed on the ground so that it sits on its shield 30. The shield 30 provides a stable base for the device to be placed on the ground. Further, as shown by the arrows in FIG. 8, there is enough distance between the lower portion of the housing 10 and the shield 30 so that the animal repellent 20 scent can adequately permeate into the air surrounding the device even when the device is placed on the ground.

In use, the chamber 15 is filled with the animal repellent 20 and then the retainer 16, 14 is combined with the housing 10 before the device is sold to the end user. The user can combine the device with a ground engaging rod 12 and then display the device near the vegetation to be protected. The scent of the repellent coming from the chamber 15 of the device acts to repel animals, such as deer, which may otherwise eat the vegetation near the device. The device allows the display of the odorous animal repellent without any contact to the plants, which is particularly desirable for gardeners who cannot use hazardous spray repellents on edible vegetation because of toxicity and EPA warnings. The housing 10 of the device protects the repellent 20 from getting wet or blown away during rain or high winds. In the first embodiment, the fibrous retainer plate 16 is such that it allows the odor to permeate the air surrounding the chamber 15, but the weave on the fiber is such that it does not allow insects into the chamber 15. In the first embodiment, the animal repellent 20 is placed in the chamber 15 before the sale of the device so that there is no need for the user to contact the repellent 20. In the second embodiment, the pores on the retainer plate 14 may allow insects to enter the chamber 15, however, the repellent is enclosed in pouches 22 which protect the repellent from insect intrusion. This second embodiment allows the user to replace the repellent pouches 22 without having to physically contact the repellent. Further, a shield 30 may be used with the device to keep raccoons and other animals from being able to pierce the retainer plate 14, 16. The shield 30 also allows the device to be free standing while still allowing the odorous animal repellent to permeate into the air surrounding the device.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is:

1. An animal repellent device comprising:
    a housing having a chamber, said chamber having an upper portion and a lower portion;
    an odorous animal repellent received by the chamber;
    an opening in the chamber lower portion;
    a retainer received by the opening in the chamber lower portion for retaining the animal repellent in the chamber, wherein the retainer allows the permeation of the animal repellent from the chamber into the outside atmosphere;
    a ring for securing the retainer over the opening in the chamber, the ring further comprises a collar extending upwardly therefrom;
    a rigid shield member combined with the ring in a spaced apart relationship from the ring to help prevent the retainer from being damaged, wherein the rigid shield member further comprises openings that allow the permeation of the animal repellent from the chamber into the outside atmosphere;
    a rod having an upper end and a lower end, wherein the rod lower end is adapted to be inserted into the ground; and
    a connector adapted to receive the rod upper end to display the device above the ground, the connector extending downwardly from within the housing chamber and having an opening at a lower end thereof, the collar of the ring being fitted inside the opening of the connector such that the connector surrounds the collar so as to join the ring and rigid shield to the housing.

2. The device of claim 1 wherein the shield extends below the opening in the chamber so the shield can rest on the ground while still allowing the animal repellent to permeate into the outside atmosphere.

3. The device of claim 1 wherein the shield is comprised of a molded plastic material so as to be rigid enough to prevent animals from being able to access and pierce the retainer.

4. The device of claim 1 wherein the shield is round.

5. The device of claim 1 wherein the retainer is comprised of a fibrous material.

6. The device of claim 1 wherein the retainer is porous.

7. The device of claim 1 wherein the housing further comprises an outer portion; and
    wherein an opening in the housing outer portion is adapted to receive a string for hanging the device.

8. The device of claim 1 wherein the rod is comprised of two or more interlocking sections so that the use can increase or decrease a height of the device by adding or removing sections of rod.

9. The device of claim 1 wherein the rod is bendable.

10. The device of claim 1 wherein the repellent is a dried blood product in granular form.

11. The device of claim 1 wherein the ring and shield are formed as one piece.

12. A device for displaying an odorous animal repellent, said device comprising:
    a housing having a chamber, said chamber having an upper portion, a lower portion, and chamber walls, wherein said chamber is adapted to receive the animal repellent;
    an opening in the chamber lower portion;
    a retainer for retaining the animal repellent in the chamber by being received into the opening in the chamber, wherein the retainer allows the permeation of the animal repellent from the chamber into the outside atmosphere;
    a ring for securing the retainer over the opening in the chamber by capturing some of the retainer between the ring and the chamber walls, the ring further comprises a collar extending upwardly therefrom;

a rigid shield member combined with the ring in a spaced apart relationship from the ring to help prevent the retainer from being damaged, wherein the rigid shield member further comprises openings that allow the permeation of the animal repellent into the outside atmosphere;

a rod having an upper end and a lower end, wherein the rod lower end is adapted to be inserted into the ground; and a connector combined with the housing, said connector adapted to receive the rod upper end to display the device above the ground, said connector extending downwardly from within the housing chamber and having an opening at a lower end thereof for receiving a portion of the ring, the collar of the ring being fitted inside the opening of the connector such that the connector surrounds the collar so as to join the ring and rigid shield to the housing.

13. A device for displaying an odorous animal repellent, said device comprising:

a housing having a chamber, said chamber having an upper portion, a lower portion, and chamber walls, wherein said chamber is adapted to receive the animal repellent;

an opening in the chamber lower portion;

a retainer for retaining the animal repellent in the chamber by being received into the opening in the chamber, wherein the retainer allows the permeation of the animal repellent from the chamber into the outside atmosphere;

a ring for securing the retainer over the opening in the chamber by capturing some of the retainer between the ring and the chamber walls, the ring further comprises a collar extending upwardly therefrom;

a rigid shield member combined with the ring in a spaced apart relationship from the ring to help prevent the retainer from being damaged, wherein the rigid shield member further comprises openings that allow permeation of the animal repellent into the outside atmosphere;

a rod having an upper end and a lower end, wherein the rod lower end is adapted to be inserted into the ground; and a connector combined with the housing, said connector adapted to receive the rod upper end to display the device above the ground, said connector extending downwardly from within the housing chamber and having an opening at a lower end thereof for receiving a portion of the ring, the collar of the ring being fitted inside the opening of the connector such that the connector surrounds the collar so as to join the ring and rigid shield to the housing;

wherein the retainer is secured over the opening in the chamber by capturing some of the retainer between the ring and the connector.

* * * * *